US009303800B2

(12) United States Patent
Collin et al.

(10) Patent No.: US 9,303,800 B2
(45) Date of Patent: Apr. 5, 2016

(54) TORQUE LIMITING FLUID CONNECTOR SYSTEM

(75) Inventors: Robert Collin, Lake Forest, CA (US); Dale Carruthers, Pasadena, CA (US); Patrick McGrath, Orange, CA (US)

(73) Assignee: Fluidmaster, Inc., San Juan Capistrano, CA (US)

( * ) Notice: Subject to any disclaimer, the term of this patent is extended or adjusted under 35 U.S.C. 154(b) by 535 days.

(21) Appl. No.: 13/159,377

(22) Filed: Jun. 13, 2011

(65) Prior Publication Data

US 2012/0117784 A1 May 17, 2012

Related U.S. Application Data

(60) Provisional application No. 61/413,319, filed on Nov. 12, 2010.

(51) Int. Cl.
*F16L 19/02* (2006.01)
*F16L 33/207* (2006.01)

(52) U.S. Cl.
CPC ......... *F16L 19/0206* (2013.01); *F16L 33/2076* (2013.01); *Y10T 29/49948* (2015.01)

(58) Field of Classification Search
CPC ... F16L 19/005; F16L 37/113; F16L 19/0206; F16L 33/2076
USPC ........... 285/247, 248, 249, 92, 330, 354, 386, 285/387, 389
See application file for complete search history.

(56) References Cited

U.S. PATENT DOCUMENTS

| 591,062 | A | 10/1897 | Smith |
| 712,905 | A | 11/1902 | Cannon |
| 827,289 | A | 7/1906 | Bowers |
| 907,473 | A | 12/1908 | Detray |
| 1,136,310 | A | 4/1915 | Burnett |
| 1,898,617 | A | * | 2/1933 | Church .......................... 285/39 |
| 2,164,485 | A | 7/1939 | Yantis |
| 2,332,972 | A | 10/1943 | Johnson |
| 2,358,461 | A | 9/1944 | Latimer |
| 2,826,107 | A | 3/1958 | Woods |
| 2,972,271 | A | 2/1961 | Gill |

(Continued)

FOREIGN PATENT DOCUMENTS

DE 4442075 C1 6/1996

OTHER PUBLICATIONS

Wojciechowski, Kris, Patents Act 1977: Examination Report under Section 18(3), May 26, 2015, 1-3, South Wales, NP10 8QQ, United Kingdom.

*Primary Examiner* — James Hewitt
(74) *Attorney, Agent, or Firm* — Gordon Rees Scully Mansukhani LLP

(57) ABSTRACT

A torque limiting fluid connector system which can be hand screwed to a maximum tightening torque and be hand loosened, including: an outer member having a front opening, a back opening, and a plurality of outwardly flexible portions separated by axially extending slots; an inner member having a front opening, a back opening, an interior threaded surface and a plurality of outwardly extending projections dimensioned to be received within the axially extending slots when the inner member is received within the outer member; a connector having one end received within the inner member and an opposite end extending out of the back end of the inner member; and a washer mounted onto the end of the connector that is received within the inner member.

15 Claims, 8 Drawing Sheets

(56) References Cited

U.S. PATENT DOCUMENTS

| | | |
|---|---|---|
| 3,145,751 A | 8/1964 | Boots |
| 3,289,524 A | 12/1966 | Rubin |
| 3,425,314 A | 2/1969 | Ohlson |
| 3,865,007 A | 2/1975 | Stanback |
| 4,068,555 A | 1/1978 | Volkman |
| 4,176,582 A | 12/1979 | Witte |
| 4,210,372 A | 7/1980 | McGee et al. |
| 4,687,392 A | 8/1987 | Bidwell |
| 5,154,557 A | 10/1992 | Houck |
| 5,180,265 A | 1/1993 | Wiese |
| 5,215,336 A | 6/1993 | Worthing |
| 5,238,342 A | 8/1993 | Stencel |
| 5,388,866 A * | 2/1995 | Schlosser .................. 285/92 |
| 5,460,468 A | 10/1995 | DiStacio |
| 5,538,378 A | 7/1996 | Van Der Drift |
| 5,823,702 A | 10/1998 | Bynum |
| 5,896,968 A | 4/1999 | Bruntz |
| 5,951,224 A | 9/1999 | DiStasio |
| 6,206,784 B1 | 3/2001 | Kato |
| 6,318,763 B1 * | 11/2001 | Huang .................. 285/256 |
| 6,439,086 B1 | 8/2002 | Bahr |
| 6,679,663 B2 | 1/2004 | DiStasio et al. |
| 7,029,216 B2 | 4/2006 | McKay |
| 7,299,725 B2 | 11/2007 | Helstern |
| 7,484,420 B2 | 2/2009 | Schuster et al. |
| 7,571,937 B2 * | 8/2009 | Patel .................. 285/92 |
| 7,954,857 B2 | 6/2011 | Helstern |
| 7,984,933 B2 | 7/2011 | Helstern |
| 2003/0002950 A1 | 1/2003 | Jameson |
| 2004/0036292 A1 | 2/2004 | Austin |
| 2004/0056481 A1 * | 3/2004 | Do et al. .................. 285/92 |
| 2004/0150224 A1 | 8/2004 | Lee |
| 2009/0218813 A1 | 9/2009 | Helstern |

* cited by examiner

TORQUE LIMITING FLUID CONNECTOR SYSTEM

RELATED APPLICATION

The present application claims priority to U.S. Provisional Patent Application Ser. No. 61/413,319, filed Nov. 12, 2010, entitled Limited Torque Nut, incorporated herein by reference in its entirety for all purposes.

TECHNICAL FIELD

The present invention relates to screw on fluid connectors.

BACKGROUND OF THE INVENTION

A common concern with standard fluid connectors is that they can be over tightened. Over tightening connectors has resulted in many problems, including damage to the connector, damage to the surface of the object to which the connector is tightened, and damage to washers positioned within the connector. These problems are especially common with plumbing connectors, for example when connecting water supply lines to toilet tanks or fill valves.

What is instead desired is a screw on fluid connector that can't be over tightened, yet can still be easily loosened. It is also desirable that this screw on connector be hand operated such that a user requires no special tool to operate or to adjust it.

What is also desirable is to provide a hand operated connector that seals a fluid line such that there is no leakage adjacent to the point where the fluid line connector is attached to a tank, valve or other fixture.

SUMMARY OF THE INVENTION

The present invention provides a hand operated screw connector that can be used to connect a fluid line to a tank, valve or any other fixture. The present hand operated screw connector can be tightened so that it only applies a pre-set maximum torque. Advantageously, the present screw connector cannot be over tightened. Once the pre-set maximum torque has been reached, the connector functions so that its outer portion continues to rotate but without its inner portion rotating further. However, the present screw connector can easily be loosened by hand (with the inner and outer portions locked firmly together).

In a preferred embodiment, the present invention provides a torque limiting fluid connector system, comprising: an outer member having a front opening, a back opening, and a plurality of outwardly flexible portions separated by axially extending slots; an inner member having a front opening, a back opening, an interior threaded surface and a plurality of outwardly extending projections dimensioned to be received within the axially extending slots when the inner member is received within the outer member; a connector having one end received within the inner member and an opposite end extending out of the back end of the inner member; and a washer mounted onto the end of the connector that is received within the inner member.

The outwardly extending projections (on the inner member) are received within the axially extending slots (on the outer member) such that when a maximum tightening torque is reached, the outwardly flexible portions then flex and slip over the outwardly extending projections to prevent the maximum tightening torque from being exceeded. However, the plurality of outwardly flexible portions do not flex outwardly and slip over the outwardly extending projections when a loosening torque is applied. Instead, the inner and outer portions of the connector remain locked firmly together. As a result, the present invention is torque-limiting in the tightening direction, but is not torque limiting in the loosening direction.

In specific preferred embodiments, the outwardly flexible portions of the outer member extend circumferentially around a portion of the inner member, and have a leading edge at one of the axially extending slots and a trailing edge at another of the axially extending slots. The leading edge is angled inwardly more than the trailing edge such that: (a) the leading edge pushes against the inwardly angled edge of the outwardly extending projections when a tightening torque is applied to the outer member; but (b) the leading edge pushes against the flat radially extending edge of the outwardly extending projections when a loosening torque is applied to the outer member.

Preferably as well, the washer has a truncated conical shape with a maximum axial thickness next to the connector, tapering down to a minimum axial thickness furthest away from the connector. The inner member preferably has a grooved recess at its back end adjacent to its interior threaded surface. As a result, the thinnest portion of the washer is received against the grooved recess when the washer is positioned flush against a rear wall of the inner member. This design provides a very strong seal since a maximum amount of the inner threaded surface of the inner member can be used for making a connection to a valve, tank or fixture.

DETAILED DESCRIPTION OF THE DRAWINGS

Figure 1:
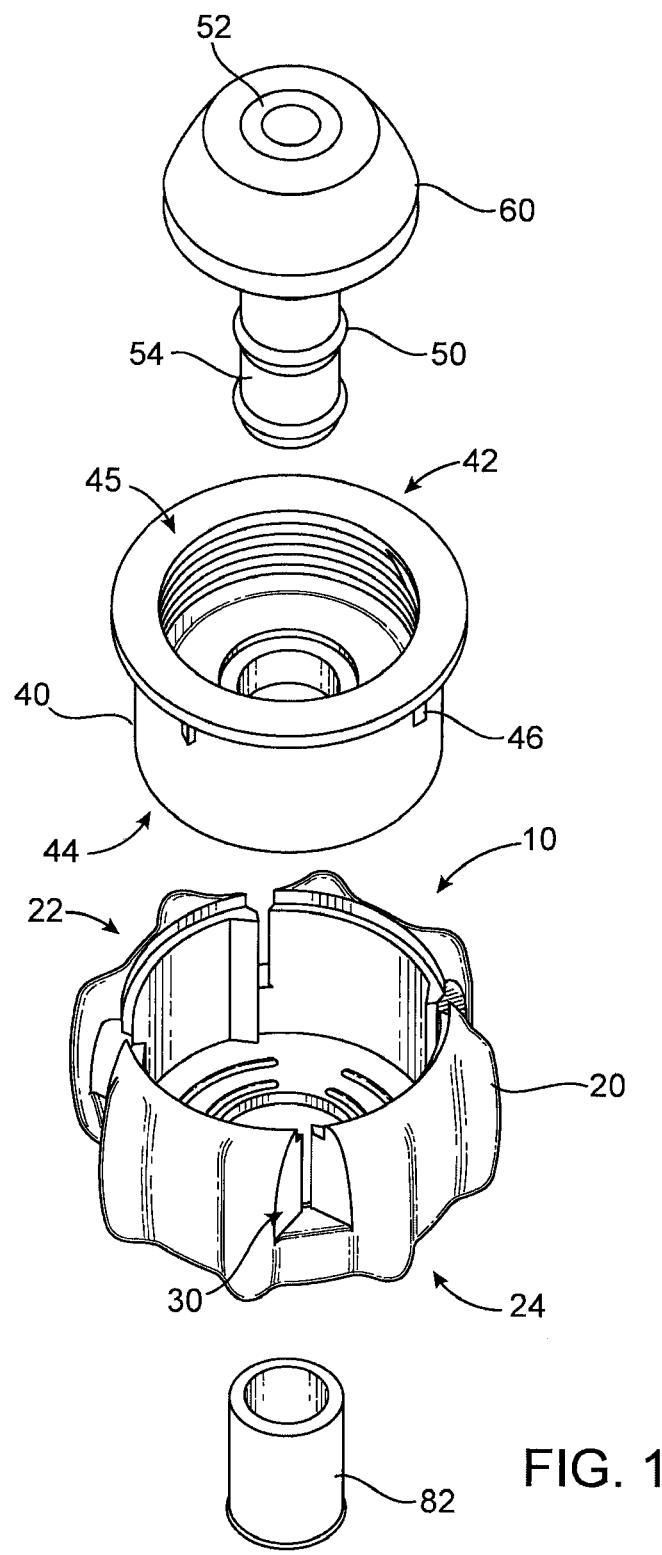
FIG. 1 is an exploded front perspective view of the present fluid connector system.
Figure 2:
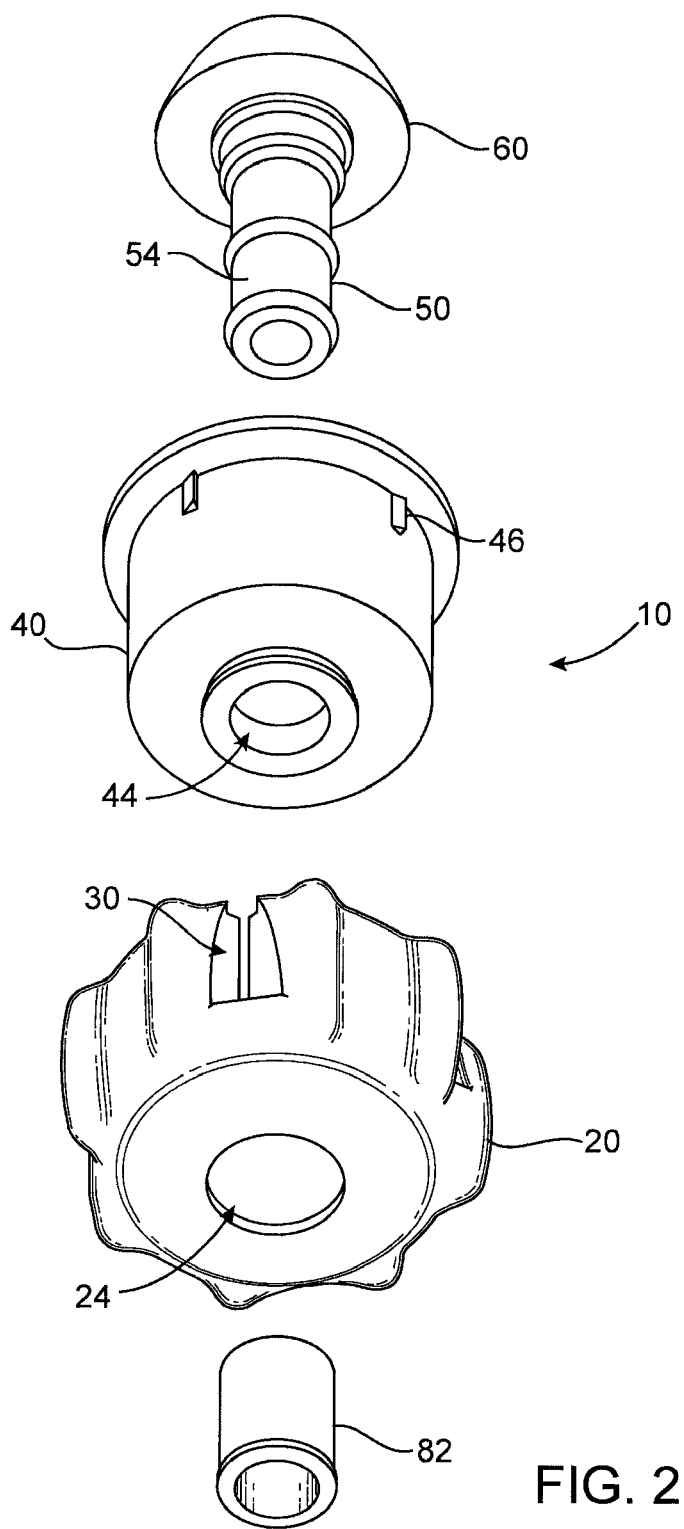
FIG. 2 is an exploded rear perspective view of the present fluid connector system.

FIGS. 1 to 5 illustrate the present connector system 10. As will be shown, connector system 10 comprises an outer member 20 and an inner member 40. Outer member 20 has a front opening 22, a back opening 24, and a plurality of outwardly flexible portions 25 separated by axially extending slots 30. Inner member 40 has a front opening 42, a back opening 44, an interior threaded surface 45 and a plurality of outwardly extending projections 46.

Projections 46 are dimensioned to be received within axially extending slots 30 when inner member 40 is received within outer member 20. As will be explained below, the relative dimensions of outwardly flexible portions 25, axially extending slots 30, and outwardly extending projections 46 operate together to form a maximum-torque tightening connector which can be hand tightened to a maximum desirable torque but easy hand loosened.

Connector system 10 further comprises a connector having end 52 received within inner member 40 and an end 54 extending out of the back end of inner member 40. Preferably, connector system 10 is preferably barbed, but it is to be understood that the present invention also encompasses non-barbed embodiments. Connector system 10 further comprises a washer 60 mounted onto end 52 of barbed connector 50. Washer 60 is preferably thickest (in the axial direction) adjacent to barbed connector 50, and thinnest furthest away from barbed connector 50, as shown. As such, washer 60 has a front face 62 that is angled such that washer 60 is shaped like a truncated cone. It is to be understood, however, that the present invention is not so limited. For example, washer 60 could instead be a flat washer.

In various embodiments, the inner and outer members 20 and 40 are made of metal, plastic or any other suitable material. The connector 50 may also be made of metal, plastic or any other suitable material. Washer 60 may similarly be made of metal, plastic or any other suitable material. It is to be understood that these materials are merely exemplary and that the present invention may be made of any other suitable materials.

Figure 6:
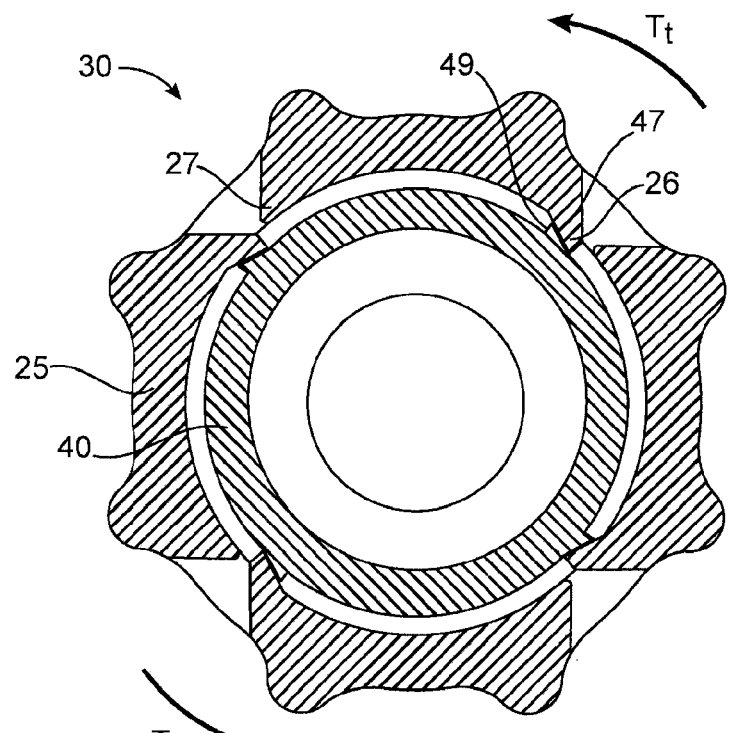
FIG. 6 is a schematic view showing the interplay between the inner and outer members as a tightening torque is applied.
Figure 7:
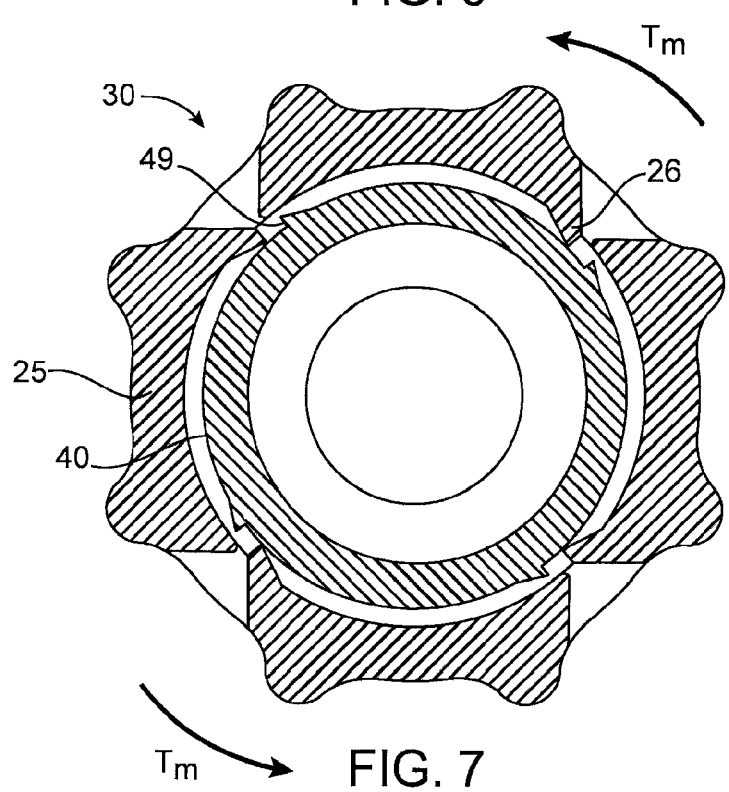
FIG. 7 is similar to FIG. 6, but shows the interplay between the inner and outer members when the pre-set maximum torque is reached.
Figure 8:
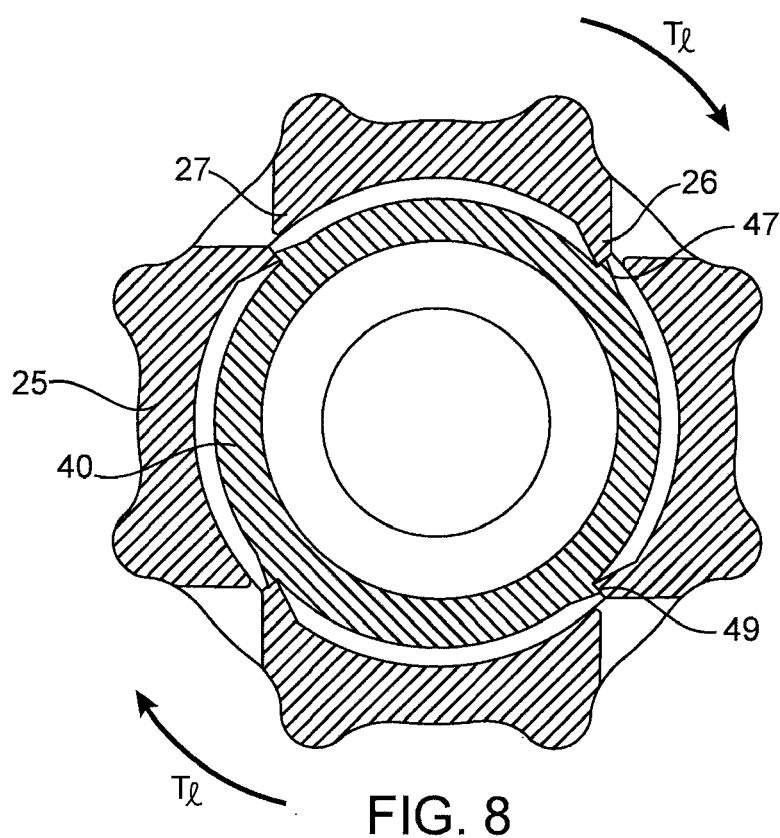
FIG. 8 is a schematic view showing the interplay between the inner and outer members as a loosening torque is applied.

FIGS. 6 to 8 illustrate further structural details of the interplay between inner member 40 and outer member 20, as follows. Axially extending slots 30 extend only partially along the axial length of outer member 20. Outwardly flexible portions 25 are formed at the front of outer member 20 between axially extending slots 30. As can also be seen, outwardly flexible portions 25 of outer member 20 extend circumferentially around the outer circumference of a portion of inner member 40. Outwardly flexible portions 25 of outer member 20 each have a leading edge 26 and a trailing edge 27. Thus, slots 30 are formed between the leading and trailing edges 26 and 27 of successive outwardly flexible portions 25. The leading edge 26 of each of the outwardly flexible portions 25 is angled inwardly more than its trailing edge 27. Outwardly extending projections 46 are received into slots 30. Each outwardly extending projection 46 has an inwardly angled edge 47 and a flat radially extending edge 49.

Figure 10:
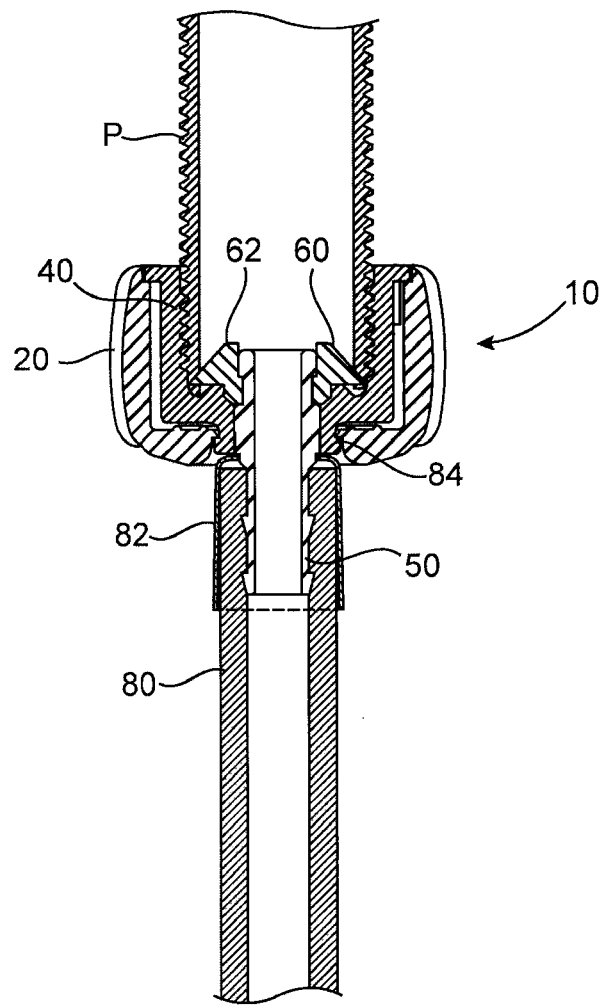
FIG. 10 is a sectional side elevation view showing the connector being fastened onto a pipe fixture.

FIGS. 6 to 8 also illustrate the interplay between inner member 40 and outer member 20 when various torques are applied to the outer member 20 of fluid connector system 10. For example, FIG. 6 illustrates a tightening torque Tt being applied to outer member 20. As can be seen, the leading edge 26 of the outwardly flexible portions 25 push against the inwardly angled edge 47 of the outwardly extending projections 46 when a tightening torque is applied to the outer member. Thus, rotating outer member 20 will cause inner member 40 to rotate in the same direction such that inner threaded surface 45 will screw onto pipe P (FIG. 10).

FIG. 7 illustrates the case where a pre-set maximum torque has been reached. Specifically, when a maximum tightening torque Tm is reached, the plurality of outwardly flexible portions flex 25 outwardly and slip over outwardly extending projections 46. Thus, inner member 40 stops rotating even though outer member 20 continues to rotate. As a result, inner member 40 can not be screwed any tighter onto pipe P (FIG. 10), thereby preventing the maximum tightening torque Tm between inner member 40 and pipe P from being exceeded.

FIG. 8 illustrates the case when a loosening torque T1 is applied to outer member 20. In this situation, the leading edge 26 of the outwardly flexible portions 25 push against the flat radially extending edge 49 of outwardly extending projections 46. As such, the plurality of outwardly flexible portions 25 do not flex outwardly and slip over the outwardly extending projections 46. Instead, a tight contact is formed such that a large loosening torque T1 can be applied (for example, loosening torque T1 can be greater than maximum tightening torque Tm, but in an opposite direction).

Figure 3:
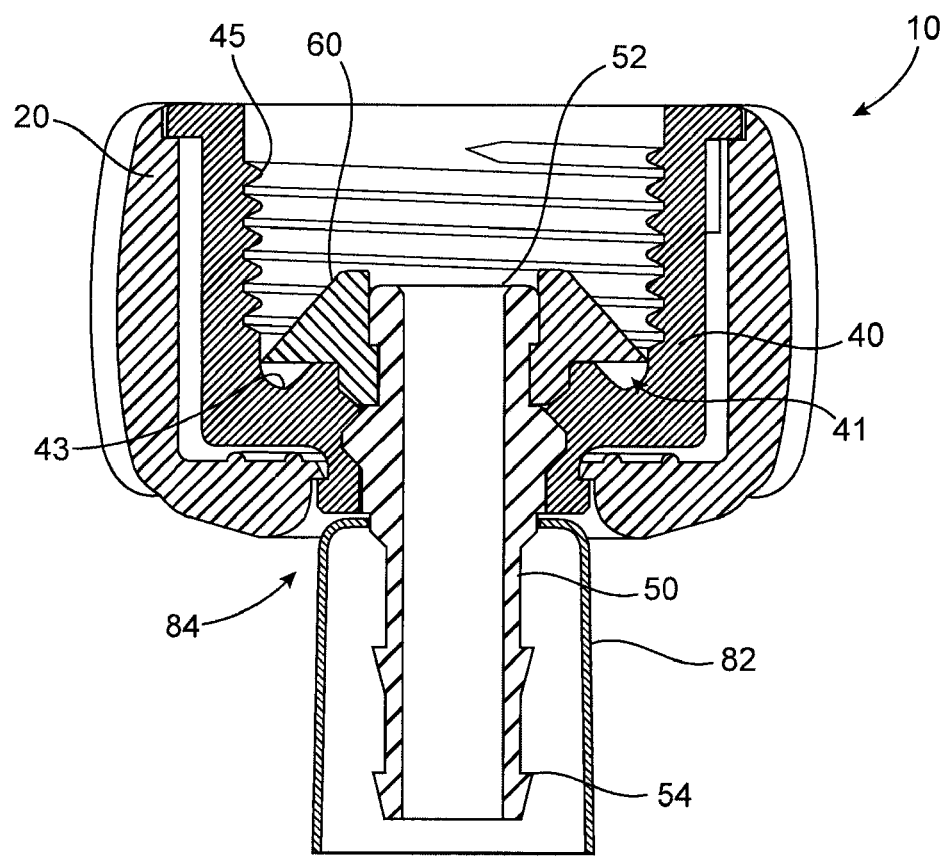
FIG. 3 is an assembled sectional side elevation view of the fluid connector system.
Figure 4:
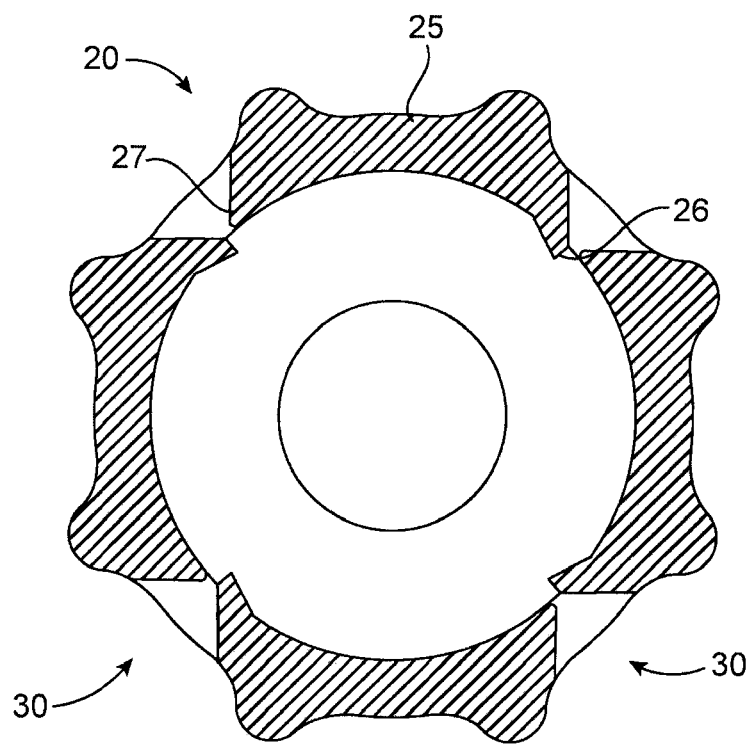
FIG. 4 is a front elevation view of the outer member.
Figure 5:
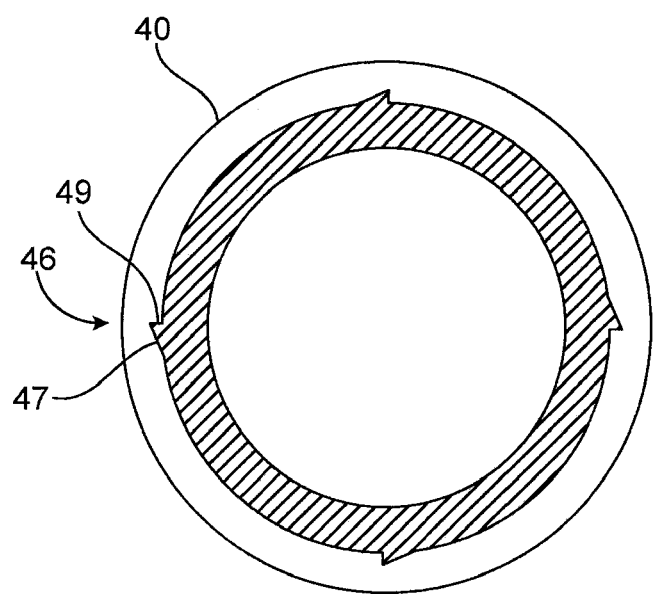
FIG. 5 is a rear elevation view of the inner member.

As can also be seen in FIG. 3, inner member 40 may optionally have a grooved recess 41 at its back interior end 43 (adjacent to its interior threaded surface 45). The thinnest portion of washer 60 is received against the grooved recess 41 when washer 60 is positioned flush against a rear wall of the inner member. This is advantageous in that it affords the maximum amount of threaded connector surface (i.e.: surface 45) to make a connection to pipe P (FIG. 10). In addition, grooved recess 41 provides a space for the outer perimeter of washer 60 to be received into when threaded surface 45 is screwed fully onto pipe P. This feature prevents over compressing and pinching of washer 60.

Figure 9:
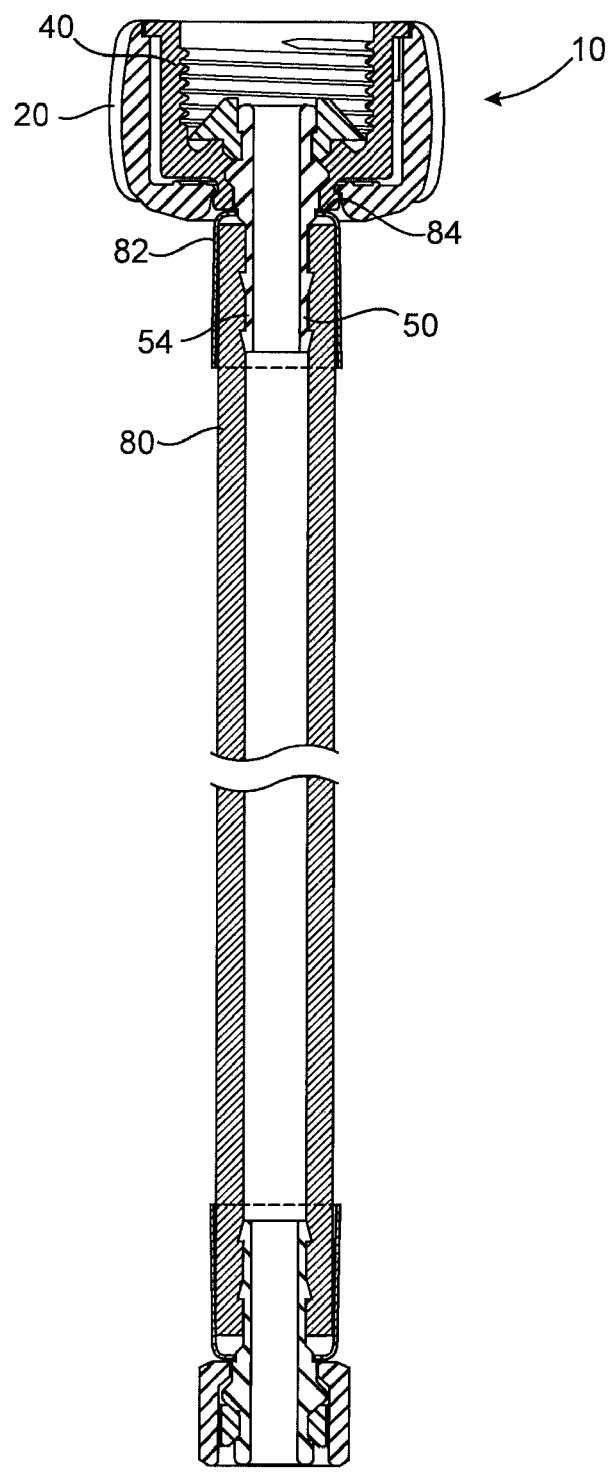
FIG. 9 is a sectional side elevation view showing a fluid line attached to the connector.

FIG. 9 shows a fluid line 80 connected to end 54 of barbed connector 50. Fluid line 80 may be either a liquid fluid line, or a gas fluid line. Additionally, an optional shell 82 can be positioned around the end of fluid line 80. Shell 82 can be crimped around the end of line 80, holding line 80 securely in place between end 54 of connector 50 and crimped shell 82. Shell 80 may have a flattened end 84 that is positioned against the back end of outer member 20. In operation, the rotation of outer member 20 (in either of the tightening or loosening directions) will only cause inner member 40 to rotate. Washer 60 and barbed connector 50 will not rotate. As a result, fluid line 80 will not rotate either. Thus, flattened end 84 will spin against the back end of outer member 20. This design is advantageous in that an operator is able to hand tighten and hand loosen connector system 10 onto pipe P without causing fluid line 80 to rotate at all.

What is claimed is:

1. A torque limiting fluid connector system, comprising:
an outer member having an external surface, an internal surface, a front opening dimensioned to receive an inner member within the internal surface, a back opening, and a plurality of outwardly flexible portions extending outwardly radially, each portion extending circumferentially part-way around the inner member and separated by axially extending slits between the external and internal surfaces;
the inner member insertable into the internal surface of the outer member and having a front opening, a back opening, an interior threaded surface to receive a threaded fluid line and a plurality of projections extending outwardly axially from an exterior surface of the inner member dimensioned to be received within the axially extending slits when the inner member is received within the outer member;
a connector having an end received within the inner member and an opposite end extending out of a back end of the inner member; and
a washer mounted onto the end of the connector that is received within the inner member; and
wherein rotating the outer member about the inner member until reaching a maximum tightening torque causes the outwardly flexible portions to flex outwardly and slip over the projections preventing the maximum tightening torque from being exceeded.

2. The system of claim 1 wherein the projections prevent the outwardly flexible portions from flexing outwardly and slipping over the projections when a loosening torque is applied.

3. The system of claim 1, wherein the axially extending slits extend only partially axially between the back opening and opposite front opening of the outer member.

4. The system of claim 1 wherein each of the outwardly flexible portions have a leading edge at one of the axially extending slits and a trailing edge at another of the axially extending slits.

5. The system of claim 1, wherein the leading edge of each of the outwardly flexible portions is angled inwardly more than the trailing edge.

6. The system of claim 5, wherein each of the projections has an inwardly angled edge and a flat radially extending edge.

7. The system of claim 6, wherein the leading edge of the outwardly flexible portions pushes against the inwardly angled edge of the projections when a tightening torque is applied to the outer member.

8. The system of claim 6, wherein the leading edge of the outwardly flexible portions pushes against the flat radially extending edge of the projections when a loosening torque is applied to the outer member.

9. The system of claim 1, wherein the washer has a maximum axial thickness next to the connector, and a minimum axial thickness furthest away from the connector.

10. The system of claim 9, wherein the washer has a truncated conical shape.

11. The system of claim 9, wherein the inner member has a grooved recess at its back end adjacent to its interior threaded surface, and wherein the thinnest portion of the washer is received against the grooved recess when the washer is positioned flush against a rear wall of the inner member.

12. The system of claim 1, wherein the fluid line is connected to the end of the connector that extends out of the back end of the inner member.

13. The system of claim 12, wherein the fluid line is a liquid fluid line.

14. The system of claim 12, wherein the fluid line is a gas fluid line.

15. The system of claim 12, further comprising: a shell positioned around an end of the fluid line, wherein the shell has a flattened end positioned against the back opening of the inner member.

* * * * *